United States Patent
Ahn et al.

(10) Patent No.: US 10,117,235 B2
(45) Date of Patent: Oct. 30, 2018

(54) METHOD AND DEVICE FOR SUPPORTING HARQ IN UNLICENSED BAND

(71) Applicant: LG ELECTRONICS INC., Seoul (KR)

(72) Inventors: Joonkui Ahn, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/094,354

(22) Filed: Apr. 8, 2016

(65) Prior Publication Data
US 2016/0302176 A1 Oct. 13, 2016

Related U.S. Application Data

(60) Provisional application No. 62/145,526, filed on Apr. 10, 2015, provisional application No. 62/151,366, filed on Apr. 22, 2015.

(51) Int. Cl.
*H04W 72/04* (2009.01)
*H04W 72/12* (2009.01)
*H04L 1/18* (2006.01)

(52) U.S. Cl.
CPC ......... *H04W 72/042* (2013.01); *H04L 1/1854* (2013.01); *H04L 1/1896* (2013.01); *H04L 1/1812* (2013.01); *H04W 72/1284* (2013.01)

(58) Field of Classification Search
CPC combination set(s) only.
See application file for complete search history.

(56) References Cited

U.S. PATENT DOCUMENTS

2015/0327275 A1* 11/2015 Kwon ................... H04L 5/0055
370/236
2016/0100382 A1* 4/2016 He ....................... H04W 72/042
370/329

* cited by examiner

*Primary Examiner* — Yee Lam
(74) *Attorney, Agent, or Firm* — Birch, Stewart, Kolasch & Birch, LLP (57) ABSTRACT

A method and device for supporting a hybrid automatic repeat request (HARQ) in an unlicensed band is provided. A user equipment receives first downlink control information (DCI) including uplink scheduling information. The first DCI further includes a carrier indicator field (CIF) indicating a cell to be scheduled. If the type of the cell indicated by the CIF is a licensed cell, the format of the DCI is determined as a first DCI format including a first resource allocation (RA) field used for the uplink scheduling information. If the type of the cell indicated by the CIF is an unlicensed cell, the format of the DCI is determined as a second DCI format including a second RA field used for the uplink scheduling information.

10 Claims, 8 Drawing Sheets

| L\S | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 2 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | |
| 3 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | | |
| 4 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | | | |
| 5 | 94 | 95 | 96 | 97 | 98 | 99 | 100 | 101 | 102 | 103 | 104 | 105 | 106 | 107 | 108 | 109 | 110 | 111 | 112 | 113 | 114 | | | | |
| 6 | 115 | 116 | 117 | 118 | 119 | 120 | 121 | 122 | 123 | 124 | 125 | 126 | 127 | 128 | 129 | 130 | 131 | 132 | 133 | 134 | | | | | |
| 7 | 135 | 136 | 137 | 138 | 139 | 140 | 141 | 142 | 143 | 144 | 145 | 146 | 147 | 148 | 149 | 150 | 151 | 152 | 153 | | | | | | |
| 8 | 154 | 155 | 156 | 157 | 158 | 159 | 160 | 161 | 162 | 163 | 164 | 165 | 166 | 167 | 168 | 169 | 170 | 171 | | | | | | | |
| 9 | 172 | 173 | 174 | 175 | 176 | 177 | 178 | 179 | 180 | 181 | 182 | 183 | 184 | 185 | 186 | 187 | 188 | | | | | | | | |
| 10 | 189 | 190 | 191 | 192 | 193 | 194 | 195 | 196 | 197 | 198 | 199 | 200 | 201 | 202 | 203 | 204 | | | | | | | | | |
| 11 | 205 | 206 | 207 | 208 | 209 | 210 | 211 | 212 | 213 | 214 | 215 | 216 | 217 | 218 | 219 | | | | | | | | | | |
| 12 | 220 | 221 | 222 | 223 | 224 | 225 | 226 | 227 | 228 | 229 | 230 | 231 | 232 | 233 | | | | | | | | | | | |
| 13 | 234 | 235 | 236 | 237 | 238 | 239 | 240 | 241 | 242 | 243 | 244 | 245 | 246 | | | | | | | | | | | | |
| 14 | 247 | 248 | 249 | 250 | 251 | 252 | 253 | 254 | 255 | 256 | 257 | 258 | | | | | | | | | | | | | |
| 15 | 259 | 260 | 261 | 262 | 263 | 264 | 265 | 266 | 267 | 268 | 269 | | | | | | | | | | | | | | |
| 16 | 270 | 271 | 272 | 273 | 274 | 275 | 276 | 277 | 278 | 279 | | | | | | | | | | | | | | | |
| 17 | 280 | 281 | 282 | 283 | 284 | 285 | 286 | 287 | 288 | | | | | | | | | | | | | | | | |
| 18 | 289 | 290 | 291 | 292 | 293 | 294 | 295 | 296 | | | | | | | | | | | | | | | | | |
| 19 | 297 | 298 | 299 | 300 | 301 | 302 | 303 | | | | | | | | | | | | | | | | | | |
| 20 | 304 | 305 | 306 | 307 | 308 | 309 | | | | | | | | | | | | | | | | | | | |
| 21 | 310 | 311 | 312 | 313 | 314 | | | | | | | | | | | | | | | | | | | | |
| 22 | 315 | 316 | 317 | 318 | | | | | | | | | | | | | | | | | | | | | |
| 23 | 319 | 320 | 321 | | | | | | | | | | | | | | | | | | | | | | |
| 24 | 322 | 323 | | | | | | | | | | | | | | | | | | | | | | | |
| 25 | 324 | | | | | | | | | | | | | | | | | | | | | | | | |

| S\L | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| 1 | | | | | | | | | | | | | | | | | | | | | | | | | |
| 2 | | | | | | | | | | | | | | | | | | | | | | | | | |
| 3 | | | | | | | | | | | | | | | | | | | | | | | | | |
| 4 | | | | | | | | | | | | | | | | | | | | | | | | | |
| 5 | | | | | | | | | | | | | | | | | | | | | | | | | |
| 6 | | | | | | | | | | | | | | | | | | | | | | | | | |
| 7 | | | | | | | | | | | | | | | | | | | | | | | | | |
| 8 | | | | | | | | | | | | | | | | | | | | | | | | | |
| 9 | | | | | | | | | | | | | | | | | | | | | | | | | |
| 10 | | | | | | | | | | | | | | | | | | | | | | | | | |
| 11 | | | | | | | | | | | | | | | | | | | | | | | | | |
| 12 | | | | | | | | | | | | | | | | | | | | | | | | | |
| 13 | | | | | | | | | | | | | | | | | | | | | | | | | |
| 14 | | | | | | | | | | | | | | | | | | | | | | | | | |
| 15 | | | | | | | | | | | | | | | | | | | | | | | | | |
| 16 | | | | | | | | | | | | | | | | | | | | | | | | | |
| 17 | | | | | | | | | | | | | | | | | | | | | | | | | |
| 18 | | | | | | | | | | | | | | | | | | | 28 | 29 | 30 | 31 | | | |
| 19 | | | | | | | | | | | | | | | | | | | 21 | 22 | 23 | 24 | 25 | 26 | 27 |
| 20 | | | | | | | | | | | | | | | | | | | 15 | 16 | 17 | 18 | 19 | 20 | |
| 21 | | | | | | | | | | | | | | | | | | | 10 | 11 | 12 | 13 | 14 | | |
| 22 | | | | | | | | | | | | | | | | | | | 6 | 7 | 8 | 9 | | | |
| 23 | | | | | | | | | | | | | | | | | | | 3 | 4 | 5 | | | | |
| 24 | | | | | | | | | | | | | | | | | | | 1 | 2 | | | | | |
| 25 | | | | | | | | | | | | | | | | | | | 0 | | | | | | |

FIG. 8

METHOD AND DEVICE FOR SUPPORTING HARQ IN UNLICENSED BAND

CROSS-REFERENCE TO RELATED APPLICATIONS

This application claims the benefit of priority of U.S. Provisional applications 62/145,526 filed on Apr. 10, 2015, and 62/151,366 filed on Apr. 22, 2015, all of which are incorporated by reference in their entirety herein.

BACKGROUND OF THE INVENTION

Field of the invention

The present invention relates to wireless communications, and more particularly, to a method for supporting a hybrid automatic repeat request (HARQ) in an unlicensed band, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Control information of the LTE is designed under the premise of an operation in the licensed band. Since the licensed band and the unlicensed band coexist, there is a need to change the design of the legacy control information.

SUMMARY OF THE INVENTION

The present invention provides a method for supporting a hybrid automatic repeat request (HARQ) in an unlicensed band. The present invention also provides a device for supporting a hybrid automatic repeat request (HARQ) in an unlicensed band.

In an aspect, a method for supporting a HARQ in an unlicensed band is provided. The method includes receiving, by a user equipment, first downlink control information (DCI) including uplink scheduling information, the first DCI further including a carrier indicator field (CIF) indicating a cell to be scheduled, determining, by the user equipment, a format of the DCI in accordance with a type of the cell indicated by the CIF, and transmitting, by the user equipment, uplink data using the uplink scheduling information. If the type of the cell indicated by the CIF is a licensed cell, the format of the DCI is determined as a first DCI format including a first resource allocation (RA) field used for the uplink scheduling information. If the type of the cell indicated by the CIF is an unlicensed cell, the format of the DCI is determined as a second DCI format including a second RA field used for the uplink scheduling information.

In another aspect, a device for supporting a HARQ in an unlicensed band is provided. The device includes a transceiver configured to receive and transmit radio signals, and a processor operatively coupled with the transceiver and configured to control transceiver to receive first downlink control information (DCI) including uplink scheduling information, the first DCI further including a carrier indicator field (CIF) indicating a cell to be scheduled, determine a format of the DCI in accordance with a type of the cell indicated by the CIF, and control transceiver to transmit uplink data using the uplink scheduling information. If the type of the cell indicated by the CIF is a licensed cell, the format of the DCI is determined as a first DCI format including a first resource allocation (RA) field used for the uplink scheduling information. If the type of the cell indicated by the CIF is an unlicensed cell, the format of the DCI is determined as a second DCI format including a second RA field used for the uplink scheduling information.

Complexity of a hybrid automatic repeat request (HARQ) operation can be decreased when a device simultaneously accesses a licensed band and an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT) a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device and may be referred to as another terminology, such as an evolved node-B (eNB), a base transceiver system (BTS), an access point, etc.

Hereinafter, the present invention is applied based on a 3rd generation partnership project (3GPP) long term evolution (LTE) according to 3GPP technical specification (TS). This is for exemplary purposes only, and thus the present invention is applicable to various communication systems.

A wireless device may be served by a plurality of serving cells under a carrier aggregation (CA) or a dual connectivity. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

Figure 1:
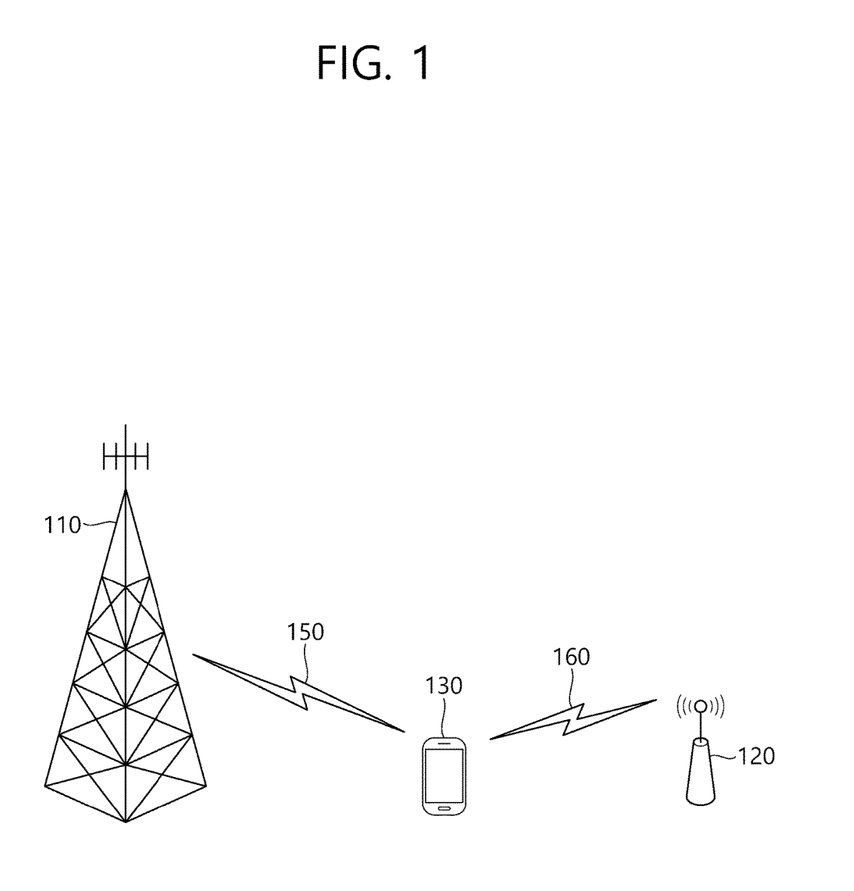
FIG. 1 shows an example of an LTE service using an unlicensed band.

FIG. 1 shows an example of an LTE service using an unlicensed band. A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in an unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LIE signal due to other WLAN devices when the LTE signal is received with power less than or equal to −62 dBm.

Hereinafter, when it is said that 'LBT is performed' or 'CCA is performed', it implies that whether a channel is idle or whether a channel is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A base station (BS) supports the LTE. A UE is a device supporting the LTE.

Hereinafter, although it is described that downlink (DL) transmission is based on transmission performed by a base station (BS) and uplink (UL) transmission is based on transmission performed by a user equipment (UE), the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term BS may be replaced with a DL node, and the term UE may be replaced with a UL node.

Hereinafter, a cell (or a carrier) operating in an unlicensed band is called an unlicensed cell or an unlicensed carrier. A cell operating in a licensed band is called a licensed cell or a licensed carrier.

Figure 2:
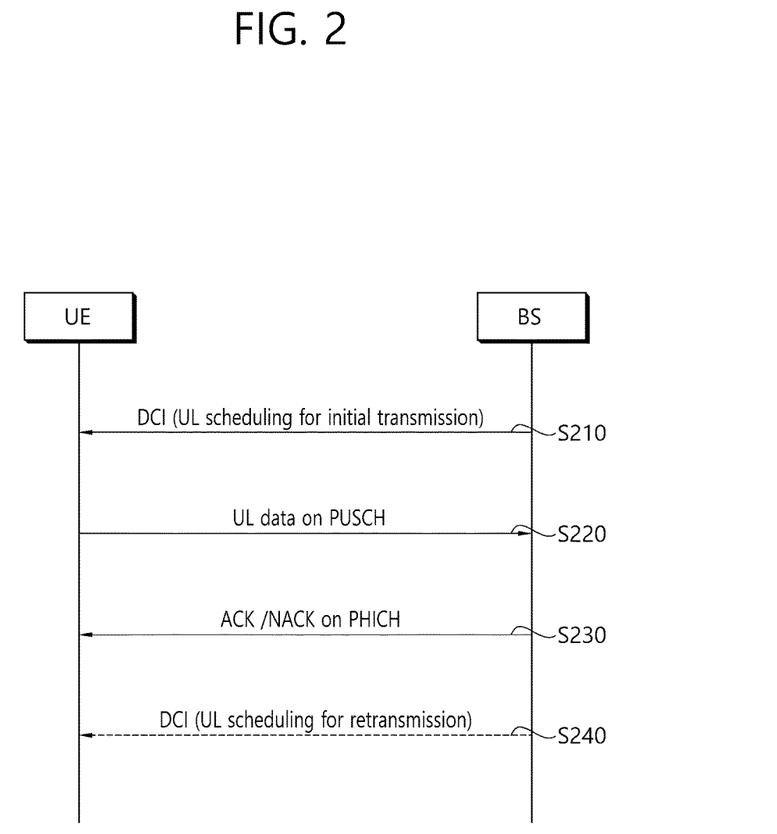
FIG. 2 shows an example of a UL HARQ operation in 3GPP LTE.

FIG. 2 shows an example of a UL HARQ operation in 3GPP LTE.

In step S210, a UE receives downlink control information (DCI) having UL scheduling information for initial transmission from a BS. According to the 3GPP LTE, the following DCI format 0 is defined for UL scheduling.

TABLE 1

| Field | Number of Bits | Description |
|---|---|---|
| Carrier indicator Field (CIF) | 0 or 3 | Index of a cell to be scheduled |
| Format Flag | 1 | value 0 indicates DCI format 0 and value 1 indicates DCI format 1A |
| Frequency hopping flag | 1 | |
| Resource block assignment and hopping resource allocation | Nra | Resource allocation for PUSCH |
| Modulation and coding scheme (MCS) and redundancy version (RV) | 5 | |

TABLE 1-continued

| Field | Number of Bits | Description |
| --- | --- | --- |
| New data indicator (NDI) | 1 | NDI is toggled when new transmission is triggered |
| Transmit power command (TPC) | 2 | |
| Cyclic shift for DM RS and OCC index | 3 | |
| UL index | 2 | |
| Downlink Assignment Index (DAI) | 2 | |
| CSI request | 1, 2 or 3 | |

As well-known, DCI is received on a DL control channel such as a physical downlink control channel (PDCCH) or an enhanced physical downlink control channel (EPDCCH). Blind decoding is used to detect the DL control channel. The blind decoding is a scheme of confirming whether a corresponding PDCCH is its control channel by de-masking a desired identifier in a cyclic redundancy check (CRC) of the received PDCCH (this is called a candidate PDCCH) and by checking a CRC error.

In step S220, the UE transmits UL data on a physical uplink shared channel (PUSCH) according to UL scheduling information.

In step S230, the BS transmits ACK/NACK regarding the UL data on a physical hybrid-ARQ indicator channel (PHICH). If the ACK/NACK indicates NACK, this indicates retransmission.

In step S240, the BS may transmit, to the UE, retransmission DCI having UL scheduling information for retransmission. Transmission of the UL scheduling information for retransmission is selective, and the BS may not provide the DCI to the UE. If the retransmission DCI is not provided, the UE may retransmit UL data according to most recently received UL scheduling.

A UL HARQ operation of 3GPP LTE is a synchronous HARQ operation in which timing between initial transmission and retransmission is determined. However, if a channel access is performed on the basis of an LBT operation in an unlicensed band, it may be difficult to retransmit UL data through a determined resource at a determined time.

Therefore, in the unlicensed band, it is proposed to perform an asynchronous UL HARQ in which timing between initial transmission and retransmission is not determined.

The following aspect needs to be considered so that the asynchronous UL HARQ operation in the unlicensed band does not cause additional complexity.

For the asynchronous UL HARQ operation, a field such as an HARQ process number needs to be added to the DCI. For example, a 5-bit HARQ process number needs to be added to the legacy DCI format 0. Although an additional DCI format may be defined for the asynchronous UL HARQ operation, this is not preferable since the adding of the DCI format may result in an increase in a blind decoding overhead.

The DCI format 0 for the legacy UL scheduling has the same number of bits as the DCI format 1A for DL scheduling. This means that the UE detects a PDCCH regardless of the DCI format 0/1A, and whether DCI of the PDCCH is a DCI format 0 or a DCI format 1A is determined through a format flag in the DCI. The DCI format 1A and the DCI format 0 are set to have the number of bits, so that the UE does not separately perform decoding for the DCI format 1A and decoding for the DCI format 0, thereby decreasing an overhead caused by blind decoding.

In order to perform the asynchronous UL HARQ operation in the unlicensed band, it is proposed a method for: 1) utilizing the DCI format 0 without a DCI format to be added; and 2) maintaining the number of DCI format 0 even if a field is added.

Figure 3:
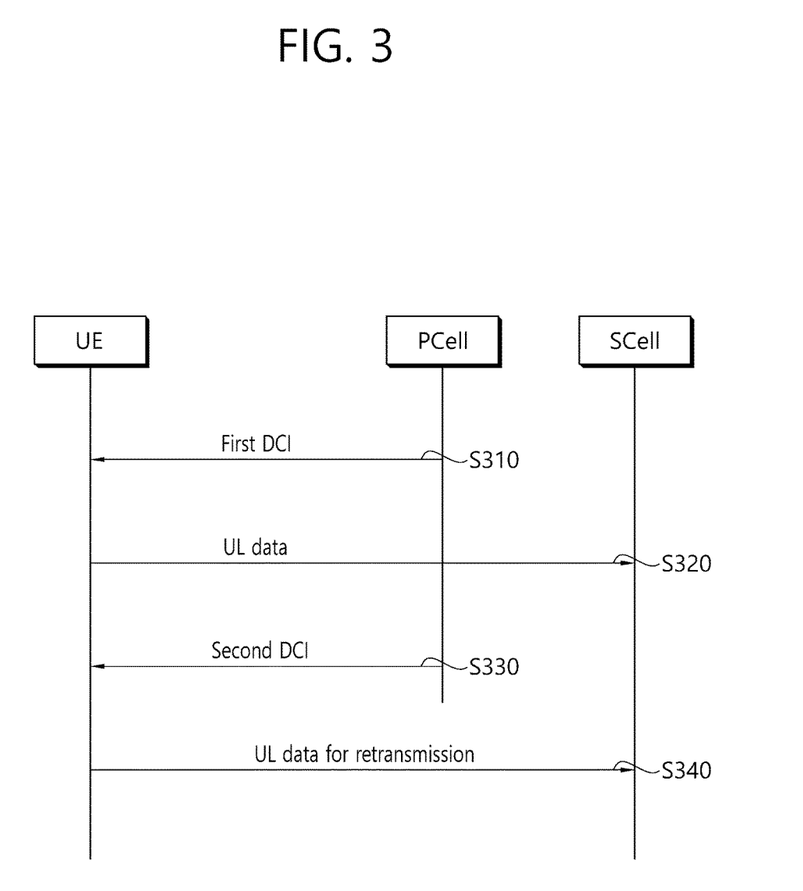
FIG. 3 shows an HARQ operation according to an embodiment of the present invention.

FIG. 3 shows an HARQ operation according to an embodiment of the present invention.

A primary cell (PCell) and a secondary cell (SCell) are configured for a UE. The PCell is a licensed cell operating in a licensed band, and the SCell is an unlicensed cell operating in an unlicensed band. The number of SCells is not restrictive, and one or more unlicensed cells or zero or more licensed cells may be configured for the UE as the SCell.

In step S310, the UE receives first DCI from the PCell. The first DCI includes UL scheduling information. The first DCI includes a CIF indicating a cell in which UL transmission is scheduled. If the cell indicated by the CIF is a licensed cell, the first DCI may have the DCI format 0 (this is called a first DCI format) shown in Table 1. If the cell indicated by the CIF is an unlicensed cell, the first DCI may have a format modified from the DCI format 0 (this is called a second DCI format). That is, the DCI may be interpreted as a different DCI format according to a type of the cell indicated by the CIF.

Herein, it is assumed that the CIF indicates the SCell. In step S320, the UE transmits UL data in the SCell according to the UL scheduling information in the DCI.

In step S330, the UE receives second DCI from the PCell. A CIF of the second DCI may indicate the SCell just link the CIF of the first DCI. The second DCI may also have the second DCI format. The second DCI may be received from the SCell.

If an HARQ process number of the second DCI is equal to an HARQ process number of the first DCI and if an NDI value of the second DCI is equal to an NDI value of the first DCI, the UE may recognize this as retransmission of UL data. This means that whether retransmission is performed may be determined only by using UL scheduling information without having to use an additional ACK/NACK signal. If the HARQ process number of the second DCI is different from the HARQ process number of the first DCI, the UE may recognize that the second DCI has scheduling information in new UL data for a new HARQ process. If the HARQ process number of the second DCI is equal to the HARQ process number of the first DCI and the NDI value of the second DCI is different from the NDI value of the first DCI, the UE may recognize that transmission of previous UL data is successful.

In step S340, if the second DCI indicates retransmission, the UE retransmits UL data in the SCell according to scheduling information in the second DCI.

As described above, the DCI may be interpreted as the first DCI format or the second DCI format. The following table shows an example of a field included in each DCI format. A field name and the number of bits are for exemplary purposes only, and thus not all fields are necessary. Further, an additional field may also exist.

TABLE 2

| Field | First DCI format (e.g. DCI format 0) | Second DCI format |
| --- | --- | --- |
| CIF | 3 bits | 3 bits |
| Resource Allocation (RA) | Nra bits | Nrb bits (Nra > Nrb) |
| HARQ Process Number | Not present | 3 bits |

TABLE 2-continued

| Field | First DCI format (e.g. DCI format 0) | Second DCI format |
|---|---|---|
| NDI | 1 bit | 1 bit |
| TPC | 2 bits | 2 bits |

The HARQ process number is only an example of a field for supporting an asynchronous HARQ in an unlicensed band.

In the legacy 3GPP LTE, UL resource allocation (RA) includes an RA type 0 and an RA type 1. The RA type 0 is a type in which a plurality of contiguous resource blocks (RBs) are scheduled by designating a starting RB and the number of RBs on the basis of an RB unit. The RA type 1 is a type in which a starting RB and ending RB of each cluster are informed to schedule two contiguous RB sets (this is called a cluster) among all RBs for a system band. For any type, Nra=ceil[$\log_2${Nb(Nb+1)/2}]. Nb is the total number of RBs in an unlicensed band.

In order for the first DCI format and the second DCI format to have the same total number of bits, the number Nrb of bits for the RA field of the second DCI format is set to be less than the number Nra of bits for the RA field of the first DCI format. For this, the following method is proposed.

In a first embodiment, allocation is performed not in an RB unit but in a resource block group (RBG) unit as to the RA field of the second DCI format. The RBG includes a plurality of RBs. The following table shows the number of bits, i.e., Nrb, when the RBG has 4 RBs or 5 RBs.

TABLE 3

| Nb | Nra, no RBG | Nrb with RBG = 5 RB | Nrb with RBG = 4 RB |
|---|---|---|---|
| 25 | 9 | 4 | 5 |
| 30 | 9 | 5 | 6 |
| 35 | 10 | 5 | 6 |
| 40 | 10 | 6 | 6 |
| 45 | 11 | 6 | 7 |
| 50 | 11 | 6 | 7 |
| 55 | 11 | 7 | 7 |
| 60 | 11 | 7 | 7 |
| 65 | 12 | 7 | 8 |
| 70 | 12 | 7 | 8 |
| 75 | 12 | 7 | 8 |
| 80 | 12 | 8 | 8 |
| 85 | 12 | 8 | 8 |
| 90 | 12 | 8 | 9 |
| 95 | 13 | 8 | 9 |
| 100 | 13 | 8 | 9 |

In a second embodiment, the RA field of the second DCI format may include a bitmap for an RBG. Each bit in the bitmap indicates whether a corresponding RBG is allocated. In an unlicensed band, if it is assumed that a great amount of RBs are scheduled for one UE in one subframe, a resource granularity allocated to each UE is not necessarily various. For example, assume that the total number of RBs in the unlicensed band is 100. If one RBG includes 25 RBs, resource allocation is possible with a 4-bit bitmap.

In a third embodiment, a resource is allocated on the basis of the RA field of the second DCI format and pre-set information. Since the RA field of the first DCI format is Nra bits, K=a-Nrb bits are defined as the pre-set information.

Figure 4:
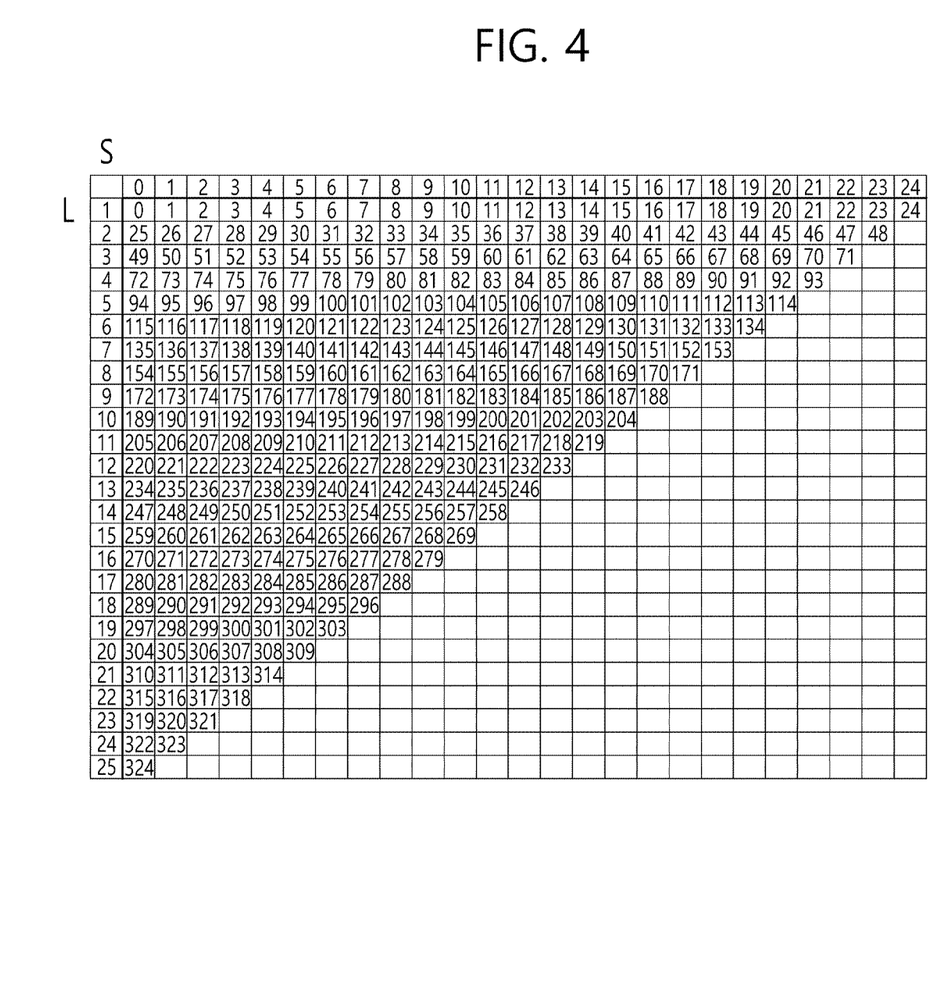
FIG. 4 shows an example of signaling according to an RA type 0 for UL RA.

FIG. 4 shows an example of signaling according to an RA type 0 for UL RA.

'S' is an RB index, and 'L' is the number of contiguous RBs. If a system band having 25 RBs is assumed, Nra=ceil [$\log_2${Nb(Nb+1)/2}]=9 since Nb=25. S ranges from 0 to 24 and L ranges from 1 to 25. Therefore, the RA field of the first DCI field may be defined as values 0 to 324.

The number of bits for the RA field of the second DCI format is less than 9 bits, and for example, may be 7 bits. The remaining 2 bits are defined as pre-set information. For example, least significant bit (LSB) 2 bits or most significant bit (MSB) 2 bits of the RA field of the first DCI format are included in the pre-set information, and the remaining bits of the RA field of the first DCI format are included in the RA field of the first DCI format. The bit of the pre-set information may be pre-set to '0' or '1'.

In general, there is no need to allocate various RBs to a UE operating in an unlicensed band. Thus, it may be preferable to allocate a resource within a limited range.

In the third embodiment, in the second DCI format, a resource may be allocated in a more limited range than the first DIC format. For example, in the second DCI format, the minimum number of RBs that can be allocated is pre-set, and the RA field may be configured when greater than or equal to the minimum number of RBs.

In general, a great amount of resources can be allocated in the unlicensed band. Thus, it may be preferable when the UE is restricted to schedule RBs at least in a specific range.

Figure 5:
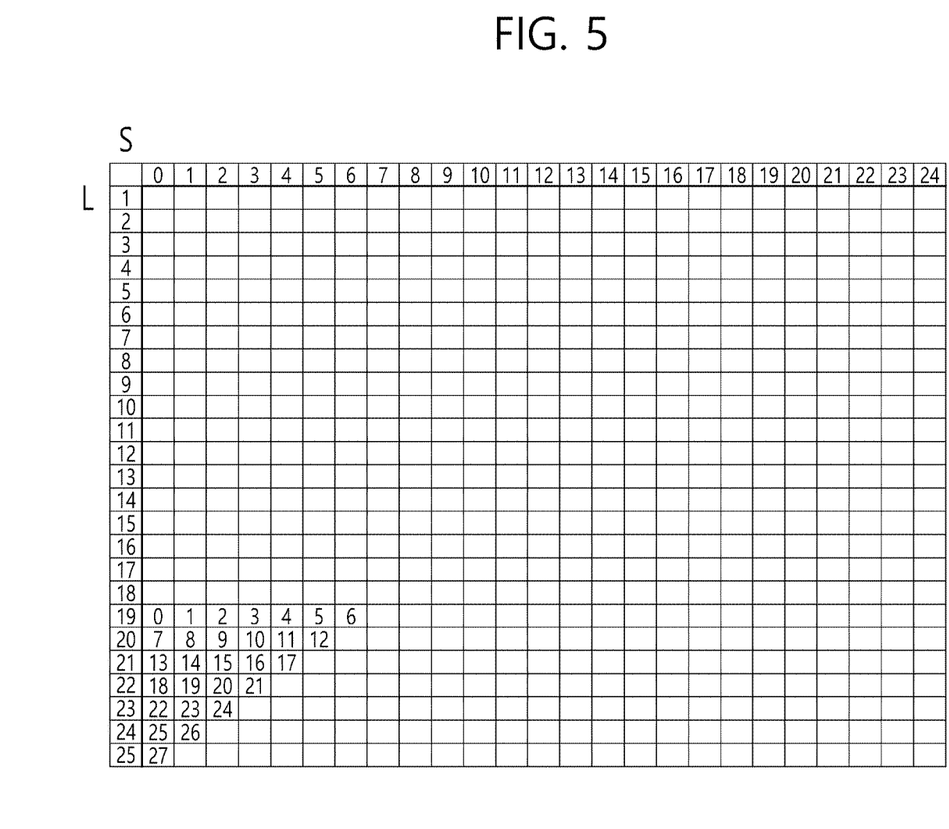
FIG. 5 to FIG. 7 show an example of allocating a resource in a limited range.
Figure 6:
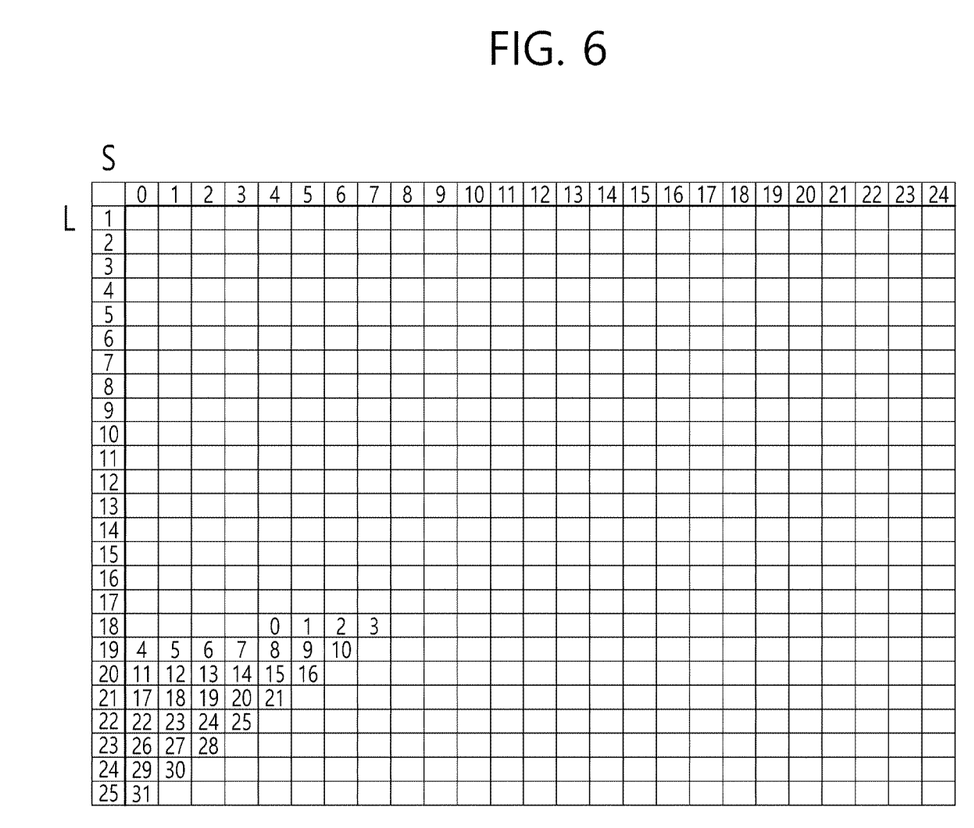
Figure 7:
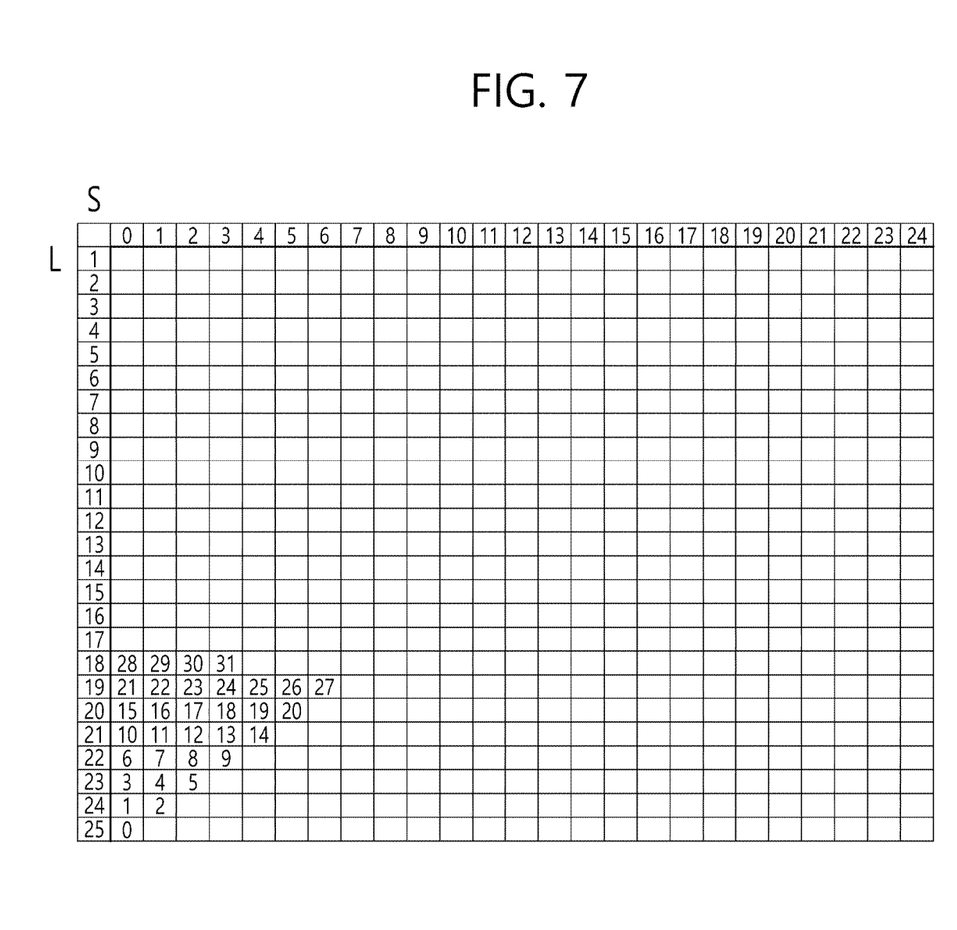

FIG. 5 to FIG. 7 show an example of allocating a resource in a limited range.

'S' is an RB index, and 'L' is the number of contiguous RBs. If a system band having 25 RBs is assumed, S ranges from 0 to 24 and L ranges from 1 to 25. In the example of FIG. 5, it is determined to schedule at least 19 RBs, and the RA field is set to have a value ranging from 0 to 27. Therefore, the RA field of the second DCI format may have 5 bits.

In the examples of FIG. 6 and FIG. 7, since the 5-bit RA field may have a value ranging from 0 to 31, a range that can be expressed with bits is additionally determined.

In the aforementioned RA scheme, "contiguous RBs (or contiguous RBGs)" indicate RBs having logically contiguous indexes, but are not limited to RBs contiguous in a frequency domain.

Meanwhile, a field used in UL power control of UL scheduling information may be used in replacement of a field for supporting an asynchronous HARQ. For example, a TPC field of the DCI format 0 may be used in replacement with a field indicating an HARQ process number. That is, it is recognized as TPC in the first DCI format, but is recognized as the HRQ process number in the second DCI format. Alternatively, the TPC field may be used in replacement of a field for indicating a redundancy version. In case of supporting a UL asynchronous HARQ in an unlicensed band, a more effective LBT operation can be guaranteed when UL transmit power of the UE is fixed to a semi-static value.

The aforementioned embodiment is described under the premise that the DCI format 0 for UL scheduling and the DCI format 1A for DL scheduling have the same number of bits. However, blind decoding may be performed separately for the DCI for UL scheduling by setting the number of bits of the DCI format for UL scheduling to be different from the number of bits of the DCI for DL scheduling. That is, in an unlicensed band, the DCI for UL scheduling is defined separately from the DCI format 0. Assume that the UL scheduling DCI in the unlicensed band is the DCI format 0A. The UE can attempt blind decoding independently of the DCI format 0A. In order to decrease the maximum number of all decoding attempts required to the UE, the number of PDCCH candidates in a search space may be decreased for at least any one of the DCI format 0 and the DCI format 1A. For example, in the legacy 3GPP LTE system, the DCI format 0 and the DCI format 1A are combined to define 4, 4, 2, and 2 PDCCH candidates respectively for an aggregation level L={2, 4, 8, 16}. If the DCI format 0A is defined, a less number of PDCCH candidates may be defined. For example, the number of PDCCH candidates of the DCI format 0 and the DCI format 1A may be defined as 2, 2, 1, and 1 respectively for the aggregation level L={2, 4, 8, 16}.

Figure 8:
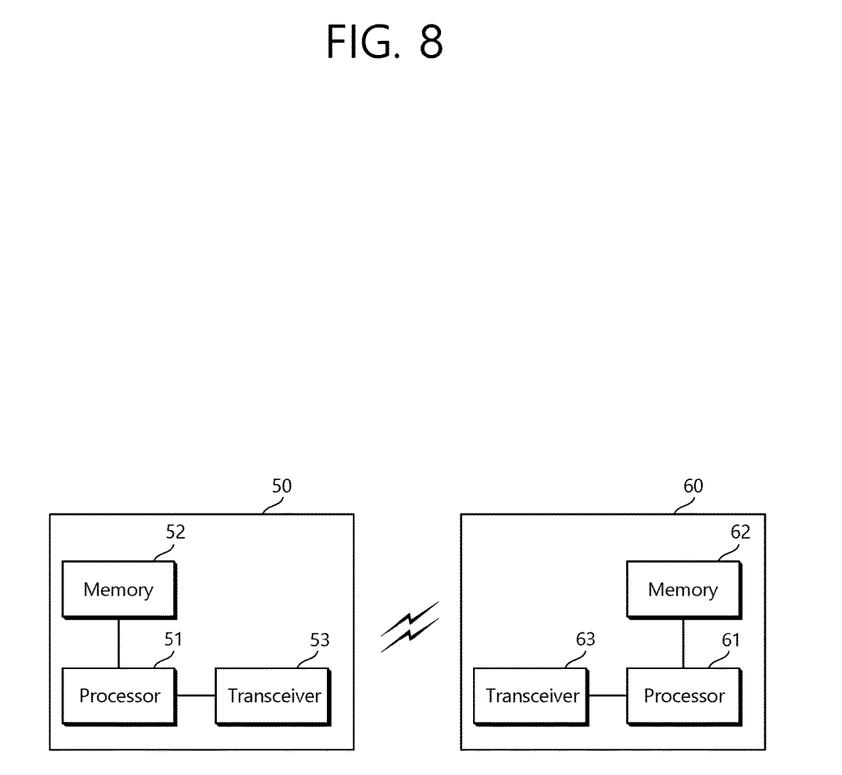
FIG. 8 is a block diagram showing a wireless communication system according to an embodiment of the present invention.

FIG. 8 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the UE may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for supporting a hybrid automatic repeat request (HARQ) in an unlicensed band, the method comprising:

receiving, by a user equipment, first downlink control information (DCI) including uplink scheduling information, the first DCI further including a carrier indicator field (CIF) indicating a cell to be scheduled;

determining, by the user equipment, a format of the DCI in accordance with a type of the cell indicated by the CIF; and transmitting, by the user equipment, uplink data using the uplink scheduling information, wherein, if the type of the cell indicated by the CIF is a licensed cell, the format of the DCI is determined as a first DCI format including a first resource allocation (RA) field used for the uplink scheduling information, wherein, if the type of the cell indicated by the CIF is an unlicensed cell, the format of the DCI is determined as a second DCI format including a second RA field used for the uplink scheduling information, wherein a number of bits for the second RA field is less than a number of bits for the first RA field, wherein remaining bits of the first RA field are unused bits by the second RA field among the first RA field, and wherein the remaining bits of the first RA field are defined as pre-set information, and most significant bit (MSB) of the remaining bits of the first RA field are pre-set to '1'.

2. The method of claim 1, wherein the second DCI format includes a field indicating a HARQ process number but the first DCI format does not include any field indicating the HARQ process number.

3. The method of claim 1, wherein the licensed cell is a primary cell and the unlicensed cell is a secondary cell.

4. The method of claim 3, wherein the first DCI is received from the primary cell.

5. The method of claim 4, wherein the first DCI is received through a downlink control channel.

6. The method of claim 1, wherein the uplink data is transmitted through a physical uplink shared channel.

7. The method of claim 1, further comprising:

receiving, by the user equipment, second DCI; and determining, by the user equipment, whether a retransmission of the uplink data is required based on the second DCI.

8. A device for supporting a hybrid automatic repeat request (HARQ) in an unlicensed band, the device comprising:

a transceiver configured to receive and transmit radio signals; and a processor operatively coupled with the transceiver and configured to:

control the transceiver to receive first downlink control information (DCI) including uplink scheduling information, the first DCI further including a carrier indicator field (CIF) indicating a cell to be scheduled, determine a format of the DCI in accordance with a type of the cell indicated by the CIF, and control the transceiver to transmit uplink data using the uplink scheduling information, wherein, if the type of the cell indicated by the CIF is a licensed cell, the format of the DCI is determined as a first DCI format including a first resource allocation (RA) field used for the uplink scheduling information, wherein, if the type of the cell indicated by the CIF is an unlicensed cell, the format of the DCI is determined as a second DCI format including a second RA field used for the uplink scheduling information, wherein a number of bits for the second RA field is less than a number of bits for the first RA field, wherein remaining bits of the first RA field are unused bits by the second RA field among the first RA field, and wherein the remaining bits of the first RA field are defined as pre-set information, and most significant bit (MSB) of the remaining bits of the first RA field are pre-set to '1'.

9. The device of claim 8, wherein the second DCI format includes a field indicating a HARQ process number but the first DCI format does not include any field indicating the HARQ process number.

10. The device of claim 8, wherein the licensed cell is a primary cell and the unlicensed cell is a secondary cell.

* * * * *